United States Patent
Yao et al.

(10) Patent No.: US 11,824,450 B2
(45) Date of Patent: Nov. 21, 2023

(54) POWER CONVERTER WITH SWITCHING POWER STAGE CIRCUITS CONNECTED IN PARALLEL

(71) Applicant: Silergy Semiconductor Technology (Hangzhou) LTD, Hangzhou (CN)

(72) Inventors: Kaiwei Yao, Hangzhou (CN); Wang Zhang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 40 days.

(21) Appl. No.: 17/346,405

(22) Filed: Jun. 14, 2021

(65) Prior Publication Data

US 2021/0399642 A1    Dec. 23, 2021

(30) Foreign Application Priority Data

Jun. 22, 2020   (CN) .......................... 202010571789.1

(51) Int. Cl.
*H02M 3/158*    (2006.01)
*H02M 1/00*    (2006.01)
*H02M 1/38*    (2007.01)

(52) U.S. Cl.
CPC ....... *H02M 3/1586* (2021.05); *H02M 1/0058* (2021.05); *H02M 1/38* (2013.01)

(58) Field of Classification Search
CPC . H02M 3/1586; H02M 3/1584; H02M 1/0058
See application file for complete search history.

(56) References Cited

U.S. PATENT DOCUMENTS

| | | | |
|---|---|---|---|
| 8,219,832 B2 * | 7/2012 | Breen, III | H02M 3/157 713/340 |
| 8,581,518 B2 | 11/2013 | Kuang et al. | |
| 10,090,765 B1 * | 10/2018 | Kanzian | H02M 3/1588 |
| 2011/0127925 A1 | 6/2011 | Huang et al. | |
| 2017/0318639 A1 | 11/2017 | Wang et al. | |
| 2018/0295685 A1 | 10/2018 | Wang et al. | |
| 2018/0295690 A1 | 10/2018 | Chen et al. | |
| 2018/0310376 A1 | 10/2018 | Huang et al. | |
| 2020/0251979 A1 * | 8/2020 | Jin | H02M 3/158 |
| 2021/0075323 A1 * | 3/2021 | Jin | H02M 3/01 |

FOREIGN PATENT DOCUMENTS

| | | |
|---|---|---|
| CN | 107346940 A | 11/2017 |
| CN | 108566092 B | 9/2018 |

* cited by examiner

*Primary Examiner* — Peter M Novak (57) ABSTRACT

A power converter can include: N switching power stage circuits, where output terminals of the N switching power stage circuits are connected in parallel, and N is a positive integer; an energy storage element coupled between an input terminal and the output terminal of the power converter, where the energy storage element is configured to periodically store energy for delivery to the output terminal of the power converter; and where after a main transistor of an M-th switching power stage circuit is turned off, a main transistor of the (M+1)-th switching power stage circuit is turned on, in order to realize zero-voltage-switching (ZVS) of the main transistor of (M+1)-th switching power stage circuit, where M is a positive integer less than N.

10 Claims, 11 Drawing Sheets

POWER CONVERTER WITH SWITCHING POWER STAGE CIRCUITS CONNECTED IN PARALLEL

RELATED APPLICATIONS

This application claims the benefit of Chinese Patent Application No. 202010571789.1, filed on Jun. 22, 2020, which is incorporated herein by reference in its entirety.

FIELD OF THE INVENTION

The present invention generally relates to the field of power electronics, and more particularly to power converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

With continuous societal development, the shortage of energy is becoming increasingly problematic. Power electronics technology has developed by leaps and bounds in recent years. At present, the high-gain power converter is an indispensable part of energy utilization. In some approaches, a cascade connection can be applied, in order to achieve high gain of the power converter. However, this can bring about a larger ripple in the output voltage and a larger output capacitor can be required.

Figure 1:
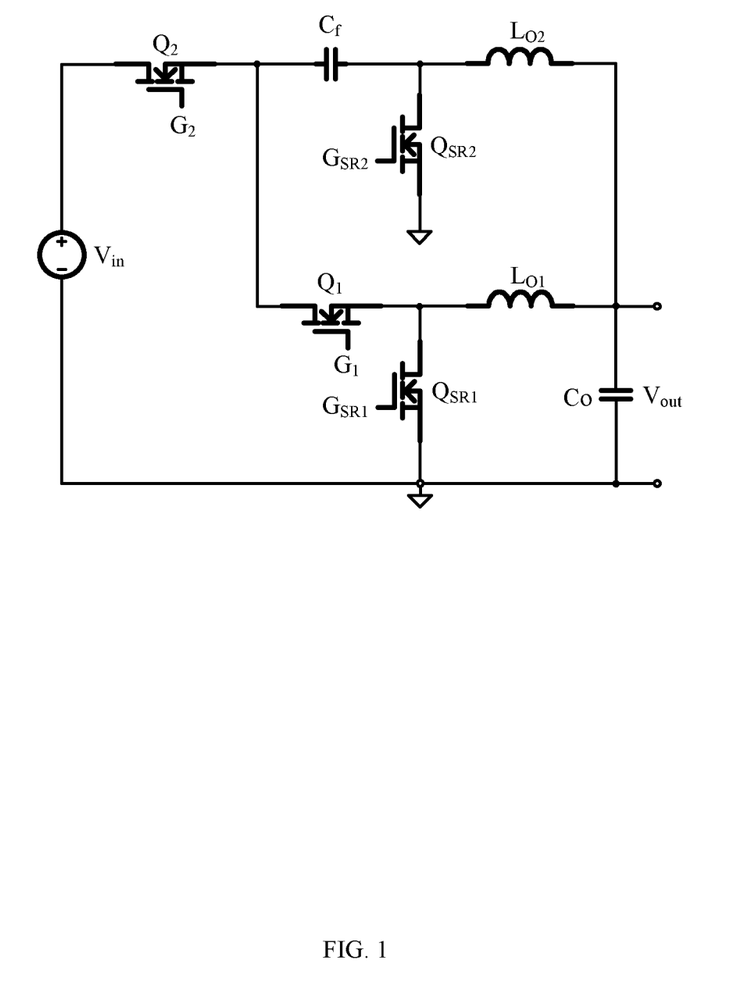
FIG. 1 is a schematic block diagram of an example power converter.

Referring now to FIG. 1, shown is a schematic block diagram of an example power converter. In this example, a power converter including two switching power stage circuits is shown. For example, the first switching power stage circuit can include transistor $Q_1$, transistor $Q_{SR1}$, and magnetic element $L_{O1}$, which forms a buck converter. The second switching power stage circuit can include transistor $Q_2$, transistor $Q_{SR2}$, magnetic component $L_{O2}$, and energy storage element $C_f$. Energy storage element $C_f$ can connect between one power terminal of transistor $Q_2$, and the common terminal of transistor $Q_{SR2}$ and magnetic component $L_{O2}$. In addition, the phase difference between the two switching power stage circuits can be configured as 180°, in order to alternately operate the two switching power stage circuits Moreover, the duty cycle of transistors $Q_1$ and $Q_2$ can be adjusted to adjust output voltage Vout of the power converter, thereby maintaining the stability of output voltage Vout.

Figure 2:
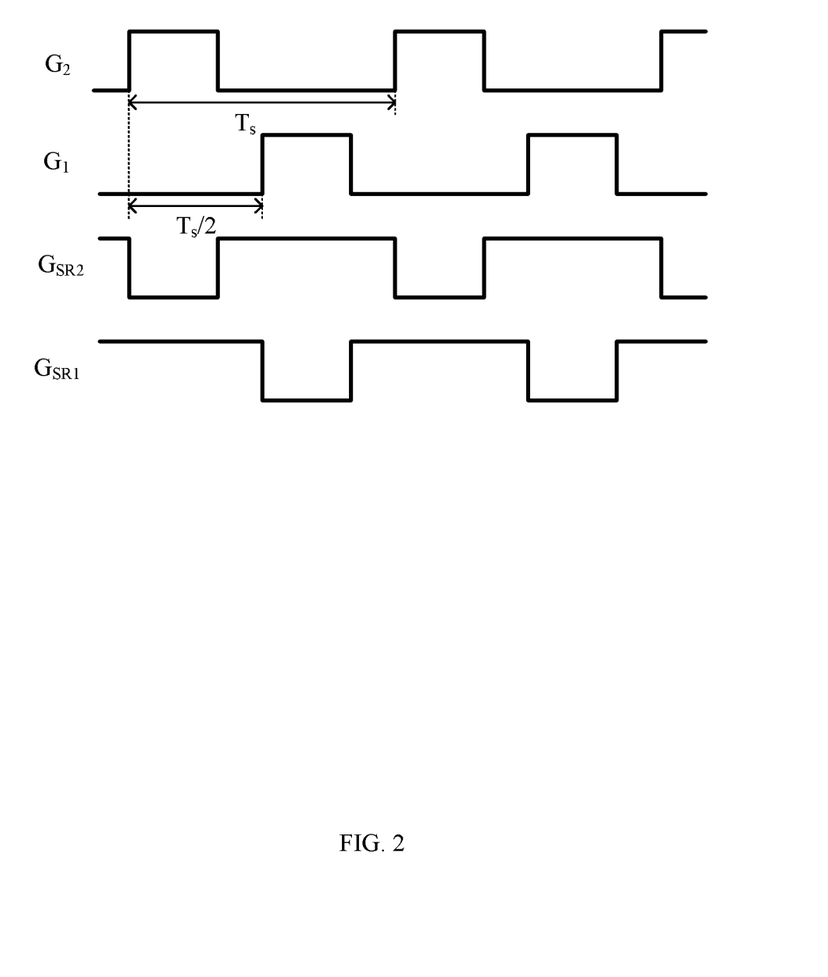
FIG. 2 is a waveform diagram of example operation of the power converter of FIG. 1.

Referring now to FIG. 2, shown is a waveform diagram of example operation of the power converter. When control signal $G_1$ is at a high level, transistors $Q_1$ and $Q_{SR2}$ can be turned on, and transistors $Q_2$ and $Q_{SR1}$ turned off. In this case, the current flowing through magnetic element $L_{O1}$ can be increased, and the current flowing through magnetic element $L_{O2}$ may be decreased. When control signal $G_2$ is at a high level, transistors $Q_2$ and $Q_{SR1}$ can be turned on, and transistors $Q_1$ and $Q_{SR2}$ turned off. In this case, the current flowing through magnetic element $L_{O1}$ can be decreased, and the current flowing through magnetic element $L_{O2}$ may be increased. In this example, the ripple of the output voltage can be reduced, and the required output capacitor also reduced due to an interleaved parallel connection of the two switching power stage circuits and the phase-shifted control operation. Since the phase difference between control signals $G_1$ and $G_2$ can be 180° in order to alternately operate the two switching power stage circuits, each transistor in the power converter can be controlled by hard switching, which can cause larger losses.

In particular embodiments, a power converter can include: N switching power stage circuits, where the output terminals of the N switching power stage circuits are connected in parallel and N is a positive integer; and an energy storage element coupled between the input terminal and the output terminal of the power converter. After the main transistor of the last switching power stage circuit is turned off, the main transistor of the next switching power stage circuit can be controlled to be turned on immediately, in order to realize zero-voltage-switching (ZVS) of the main transistor of the next switching power stage circuit. That is, after the main transistor of the M-th switching power stage circuit is turned off, the (M+1)-th switching power stage circuit can be turned on immediately after a controlled time in one switching cycle. For example, the controlled time is the dead time. Further, the length of the dead time can be adaptively adjusted according to system requirements. For example, the length of the dead time may not be greater than the freewheeling time of the current flowing through the parasitic inductor of the energy storage element, or not greater than the freewheeling time of the current flowing through the auxiliary inductor connected in series with the energy storage element.

Figure 3:
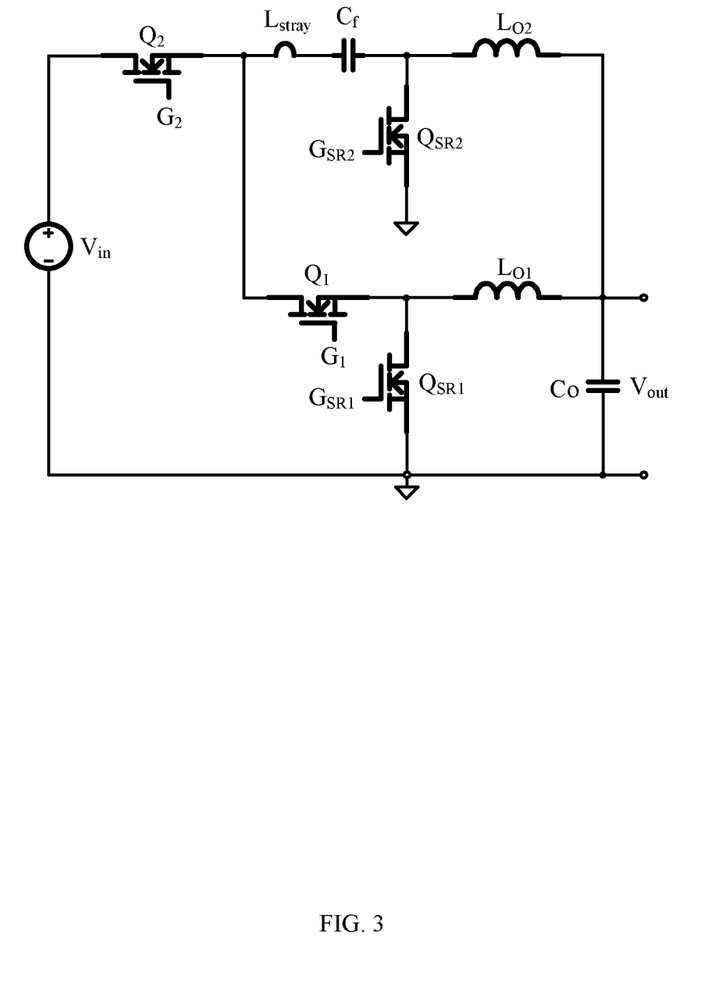
FIG. 3 is a schematic block diagram of a first example power converter, in accordance with embodiments of the present invention.

Referring now to FIG. 3, shown is a schematic block diagram of a first example power converter, in accordance with embodiments of the present invention. In this particular example, shown is a power converter including two switching power stage circuits. For example, the first switching power stage circuit can include transistor $Q_1$, transistor $Q_{SR1}$, and magnetic element $L_{O1}$, which forms a buck converter. The second switching power stage circuit can include transistor $Q_2$, transistor $Q_{SR2}$, magnetic component $L_{O2}$, and energy storage element $C_f$. Energy storage element $C_f$ can connect between one power terminal of transistor $Q_2$, and the common terminal of transistor $Q_{SR2}$ and magnetic component $L_{O2}$.

In this example, inductor $L_{stray}$ is a parasitic inductor of energy storage element $C_f$. In other examples, an auxiliary inductor connected in series with energy storage element $C_f$ can be applied in the switching power stage circuit, and the inductance value of the auxiliary inductor may be greater than that of parasitic inductor $L_{stray}$, in order to increase the freewheeling time of the inductor current. In addition, inductor $L_{stray}$ can be a parasitic inductor of the wiring. For example, transistors $Q_{SR1}$ and $Q_{SR2}$ can be rectifying transistors (e.g., MOSFET, BJT, IGBT, etc.). In another example, transistors $Q_{SR1}$ and $Q_{SR2}$ can instead be diodes.

Figure 4:
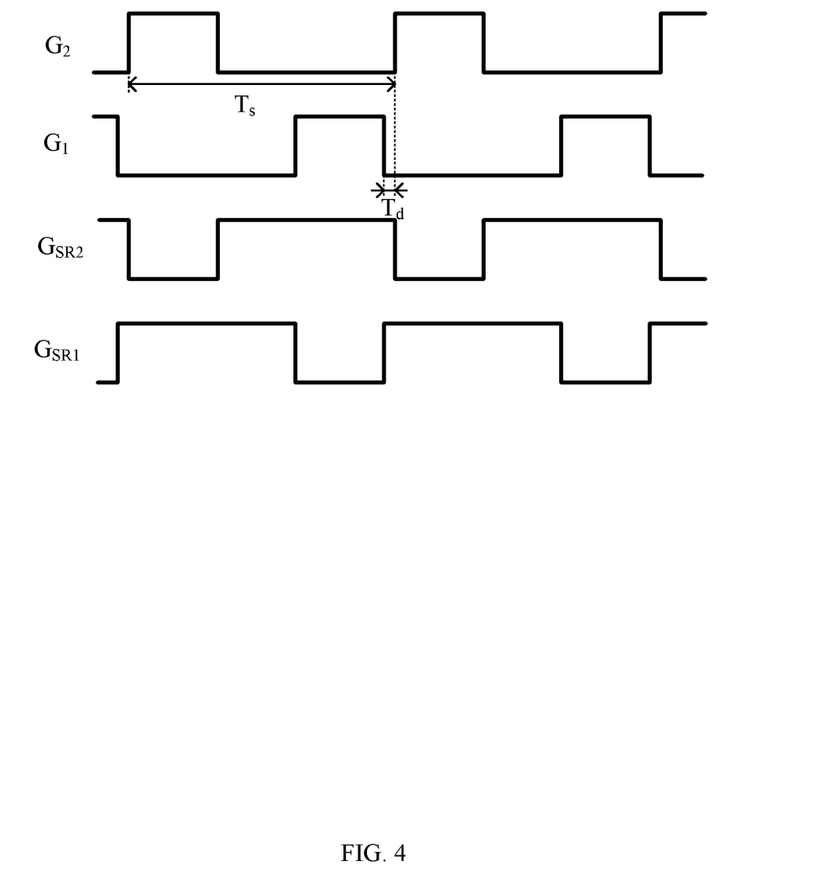
FIG. 4 is a waveform diagram of example operation of the power converter in the first example, in accordance with embodiments of the present invention.

Referring now to FIG. 4, shown is a waveform diagram of example operation of the power converter in the first example, in accordance with embodiments of the present invention. In this example, control signals $G_1$ and $G_{SR1}$ are complementary, and control signals $G_2$ and $G_{SR2}$ are complementary. Further, control signal $G_2$ can become a high level after dead time $T_d$ has elapsed from control signal $G_1$ going to a low level. When control signals $G_1$ and $G_{SR2}$ are at high levels, transistors $Q_1$ and $Q_{SR2}$ can be turned on, and transistors $Q_2$ and $Q_{SR1}$ turned off. In this case, energy storage element $C_f$ can be discharged to supply power for the first switching power stage circuit, and thus the current flowing through magnetic element $L_{O1}$ can be increased and the current flowing through magnetic element $L_{O2}$ decreased.

After dead time $T_d$ from control signal $G_1$ going low, when control signals $G_2$ and $G_{SR1}$ are both at high levels, transistors $Q_2$ and $Q_{SR1}$ can be turned on, and transistors $Q_1$ and $Q_{SR2}$ turned off. In this case, energy storage element $C_f$ can be charged by input voltage $V_{in}$, and thus the current flowing through magnetic element $L_{O1}$ may be decreased, and the current flowing through magnetic element $L_{O2}$ increased. In this example, the ripple of the output voltage can be reduced and the required output capacitor also reduced due to the interleaved parallel connection of the two switching power stage circuits and the phase-shifted control operation. Moreover, since dead time $T_d$ can be set to avoid that the two switching power stage circuits being turned on at the same time and the time length of dead time $T_d$ is relatively short, the current flowing through the auxiliary inductor or parasitic inductor $L_{stray}$ can freewheel through the body diode of transistor $Q_2$ after transistor $Q_1$ has turned off. In that case, the voltage across the power terminals of transistor $Q_2$ can be 0. When transistor $Q_1$ is turned off, transistor $Q_2$ may be turned on after dead time $T_d$, in order to realize the zero-voltage-switching (ZVS) of transistor $Q_2$.

After the main transistor of the switching power stage circuit corresponding to energy storage element $C_f$ is turned off, the current flowing through the auxiliary inductor or parasitic inductor $L_{stray}$ may freewheel through the body diode of the main transistor of a next switching power stage circuit. Accordingly, the ZVS of the main transistor of the next switching power stage circuit can be realized by turning on the main transistor of the next switching power stage circuit after a dead time has elapsed. Here, energy storage element $C_f$ may periodically store energy and transmit the energy to the output of the power converter through the switching power stage circuit corresponding to energy storage element $C_f$.

It should be noted that since N switching power stage circuits are interleaved to alternately operate, the duty ratio of the main transistor of each switching power stage circuit can be less than 1/N in one cycle. In this example, after the main transistor of one switching power stage circuit has turned off, the current flowing through the auxiliary inductor or parasitic inductor $L_{stray}$ may freewheel through the body diode of the main transistor of a next switching power stage circuit. Therefore, the ZVS of the main transistor of the next switching power stage circuit can be realized by turning on the main transistor of the next switching power stage circuit after a dead time. In such a case, the phase difference between the two adjacent switching power stage circuits can be less than 360°/N.

Figure 5:
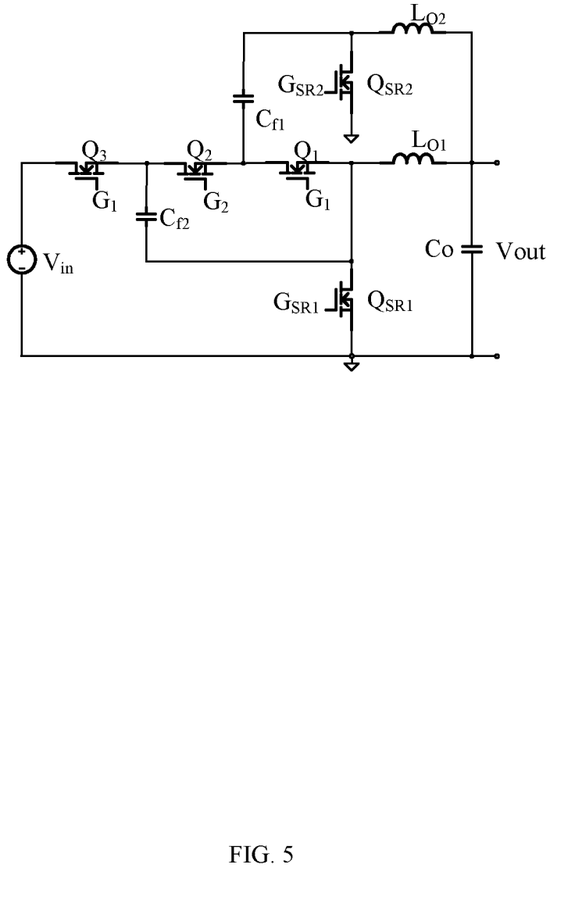
FIG. 5 is a schematic block diagram of a second example power converter, in accordance with embodiments of the present invention.

Referring now to FIG. 5, shown is a schematic block diagram of a second example power converter, in accordance with embodiments of the present invention. In this particular example transistor $Q_3$ can connect between the input terminal of the power converter and transistor $Q_2$, and energy storage element $C_{f2}$ can connect between the common terminal of transistors $Q_2$ and $Q_3$ and one power terminal of transistor $Q_{SR1}$ that is not connected with ground. It should understood that the number of energy storage elements can be adjusted in order to adjust a voltage conversion ratio of input voltage $V_{in}$, and output voltage Vout. In this second example, the voltage conversion ratio of input voltage $V_{in}$, and output voltage Vout can be different from that in the first example, and the principle of realizing the ZVS of the main transistor in the second example may be the same as that in the first example.

The waveform diagram of the operation of the power converter in this second example is the same as that shown in FIG. 4. Referring back to FIG. 4, when control signals $G_1$ and $G_{SR2}$ are at high levels, transistors $Q_1$, $Q_3$, and $Q_{SR2}$ can be turned on, and transistors $Q_2$ and $Q_{SR1}$ turned off. In this case, energy storage element $C_{f1}$ can be discharged to supply power for the first switching power stage circuit, and magnetic element $L_{O1}$ may be charged by input voltage $V_{in}$, through transistor $Q_3$ and energy storage element C. In addition, energy storage element $C_{f2}$ can be charged by input voltage $V_{in}$. Accordingly, the current flowing through magnetic element $L_{O1}$ can be increased, and the current flowing through magnetic element $L_{O2}$ decreased.

After dead time $T_d$ has elapsed from control signal $G_1$ going to a low level, when control signals $G_2$ and $G_{SR1}$ are both at high levels, transistors $Q_2$ and $Q_{SR1}$ can be turned on, and transistors $Q_1$, $Q_3$, and $Q_{SR2}$ turned off. In this case, energy storage element $C_{f2}$ can be discharged, and energy storage element $C_{f1}$ may be charged. Also, energy storage element $C_{f2}$ can be discharged to supply power for magnetic element $L_{O2}$ through transistor $Q_{SR1}$ and energy storage element $C_{f1}$. Therefore, the current flowing through magnetic element $L_{O1}$ can be decreased, and the current flowing through magnetic element $L_{O2}$ increased. Similarly, the current flowing through the parasitic inductor (not shown in FIG. 5) of energy storage element $C_{f1}$, and the current flowing through the parasitic inductor (not shown in FIG. 5) of energy storage element $C_{f2}$ can freewheel through the body diode of transistor $Q_2$ after transistors $Q_1$ and $Q_3$ are turned off. In that case, the voltage across the power terminals of transistor $Q_2$ can be 0. When transistor $Q_1$ is turned off, transistor $Q_2$ may be turned on after dead time $T_d$ has elapsed, in order to realize the ZVS of transistor $Q_2$.

In this example, the duty ratio of the main transistors (e.g., transistors $Q_1$ and $Q_2$) is D, the voltage across energy storage element $C_{f1}$ is $VC_{f1}$, and the voltage across energy storage element $C_{f2}$ is $VC_{f2}$. The following formulas can be obtained: $(Vin-VC_{f2})*D=Vout$; $VC_{f1}*D=Vout$; and $(VC_{f2}-VC_{f1})*D=Vout$. Therefore, it can be obtained that $VC_{f2}=2/3Vin$; and $Vout=1/3Vin*D$. It can be seen that the number of energy storage elements can be adjusted, in order to achieve a voltage conversion ratio that meets the requirements.

Figure 6:
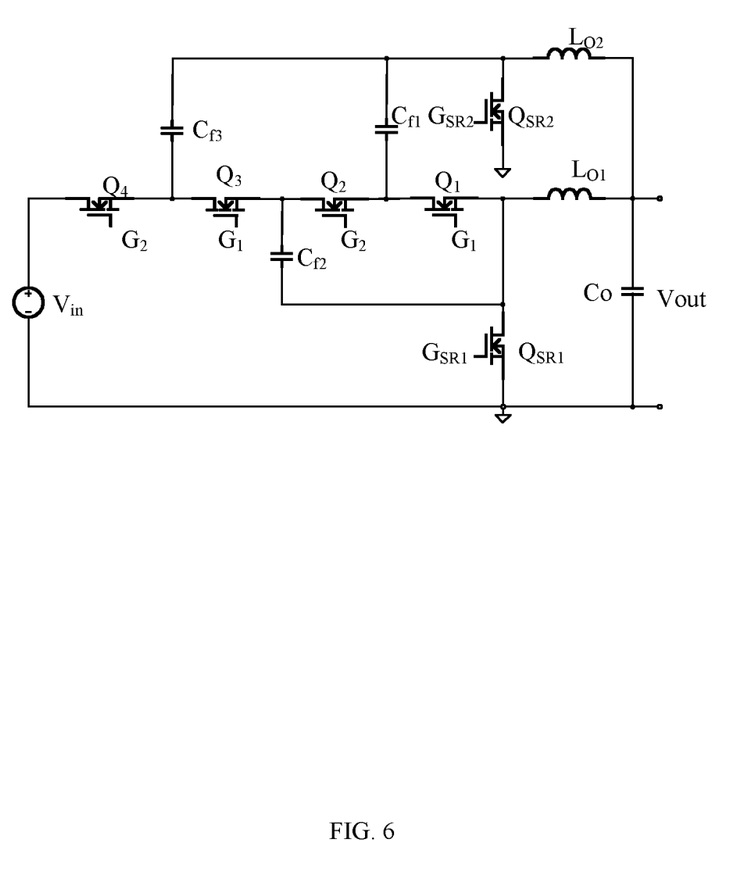
FIG. 6 is a schematic block diagram of a third example power converter, in accordance with embodiments of the present invention.

Referring now to FIG. 6, shown is a schematic block diagram of a third example power converter, in accordance with embodiments of the present invention. In this particular example transistor $Q_4$ can connect between the input terminal of the power converter, transistor $Q_3$ can be included, and energy storage element $C_{f3}$ can connect between the common terminal of transistors $Q_3$ and $Q_4$ and one power terminal (that is not connected to ground) of transistor $Q_{SR2}$.

Referring back to FIG. 4, which may also be applied to this third example. When control signals $G_1$ and $G_{SR2}$ are at high levels, transistors $Q_1$, $Q_3$, and $Q_{SR2}$ can be turned on, and transistors $Q_4$, $Q_2$, and $Q_{SR1}$ turned off. In this case, energy storage element $C_{f1}$ can be discharged through transistors $Q_1$ and $Q_{SR2}$ to supply power for magnetic element $L_{O1}$, and energy storage element $C_{f3}$ can also be discharged to supply power for magnetic element $L_{O1}$ at the same time. During this process, energy storage element $C_{f2}$ can be charged, and energy storage elements $C_{f1}$ and $C_{f3}$ may be discharged. Accordingly, the current flowing through magnetic element $L_{O1}$ can be increased, and the current flowing through magnetic element $L_{O2}$ decreased.

After dead time $T_d$ has elapsed from control signal $G_1$ going to a low level, when control signals $G_2$ and $G_{SR1}$ are both at high levels, transistors $Q_4$, $Q_2$, and $Q_{SR1}$ can be turned on, and transistors $Q_1$, $Q_3$, and $Q_{SR2}$ turned off. In this case, energy storage element $C_{f2}$ can be discharged through energy storage element $C_{f1}$ and transistor $Q_{SR1}$ to supply power for magnetic element $L_{O2}$. In addition, input voltage $V_{in}$, may supply power for magnetic element $L_{O2}$ through transistor $Q_4$ and energy storage element $C_{f3}$. During this process, energy storage element $C_{f2}$ can be discharged, and energy storage elements $C_{f1}$ and $C_{f3}$ may be charged. Accordingly, the current flowing through magnetic element $L_{O1}$ can be decreased, and the current flowing through magnetic element $L_{O2}$ increased.

Similarly, after the transistors controlled by control signal $G_1$ are turned off, the current flowing through the parasitic inductor of energy storage element $C_{f1}$ and the current flowing through the parasitic inductor of energy storage element $C_{f2}$ can freewheel through the body diode of transistor $Q_2$. The current flowing through the parasitic inductor of energy storage element $C_{f3}$ may freewheel through the body diode of transistor $Q_4$. In that case, the voltage across the power terminals of transistor $Q_2$ and the voltage across the power terminals of transistor $Q_4$ may be 0. When transistors $Q_1$ and $Q_3$ are turned off, transistors $Q_2$ and $Q_4$ can be turned on after dead time $T_d$ has elapsed so as to realize the ZVS of transistors $Q_2$ and $Q_4$.

In this example, similarly, the duty ratio of the main transistors (e.g., transistors $Q_1$ and $Q_2$) is D, the voltage across energy storage element $C_{f1}$ is $VC_{f1}$, the voltage across energy storage element $C_{f2}$ is $VC_{f2}$, and the voltage across energy storage element $C_{f3}$ is $VC_{f3}$. Therefore, the following formulas can be obtained: $VC_{f3}=3/4Vin$; $VC_{f1}=1/4Vin$; and $Vout=1/4Vin*D$. It should be understood that the number of energy storage elements may be adjusted in order to achieve a voltage conversion ratio of input voltage $V_{in}$, and output voltage Vout that meets the requirements.

Figure 7:
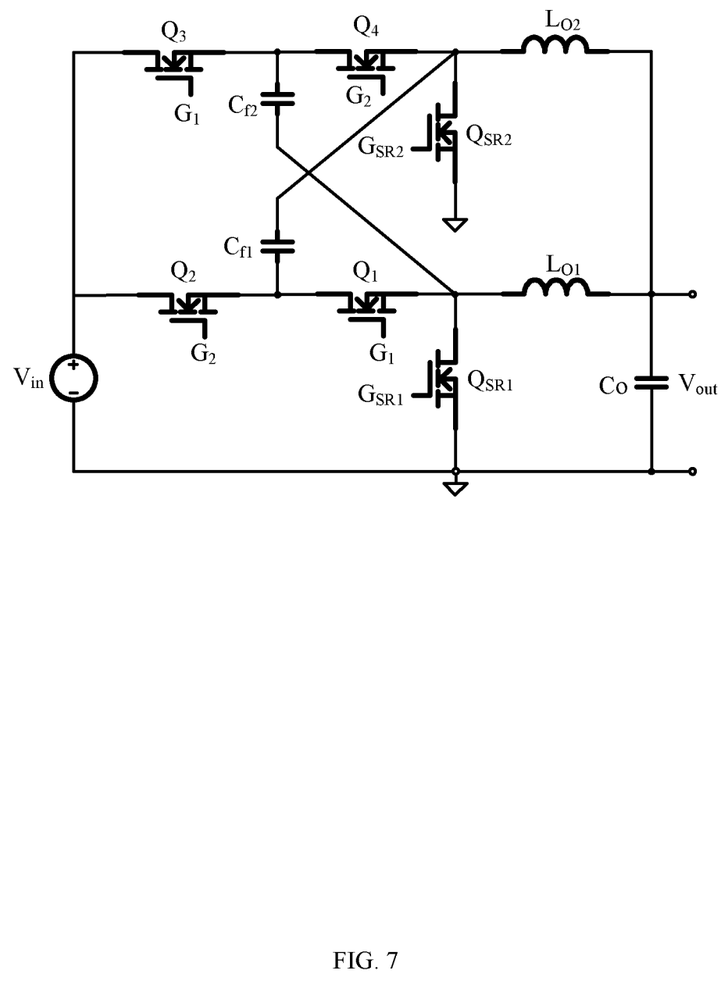
FIG. 7 is a schematic block diagram of a fourth example power converter, in accordance with embodiments of the present invention.

Referring now to FIG. 7, shown is a schematic block diagram of a fourth example power converter, in accordance with embodiments of the present invention. In this particular example, a cross structure is shown, which aims to couple the energy storage element with two adjacent switching power stage circuits, and each energy storage element can connect between the corresponding main transistors of the two adjacent switching power stage circuits and with the magnetic element of at least one switching power stage circuit. In this example, transistors $Q_3$ and $Q_4$ can connect in series between the input terminal of the power converter and magnetic element $L_{O2}$. Also, extra energy storage element $C_{f2}$ can connect between the common terminal of transistors $Q_3$ and $Q_4$ and one power terminal (that is not connected to the ground) of transistor $Q_{SR1}$.

The waveform diagram of the operation of the fourth example power converter may be the same as that in the first example shown in FIG. 4. Referring back to FIG. 4, when control signals $G_1$ and $G_{SR2}$ are at high levels, transistors $Q_1$, $Q_3$, and $Q_{SR2}$ can be turned on, and transistors $Q_2$, $Q_4$, and $Q_{SR1}$ turned off. In this case, energy storage element $C_{f1}$ can be discharged through transistor $Q_1$ to supply power for magnetic element $L_{O1}$. In addition, input voltage $V_{in}$ may supply power to magnetic element $L_{O1}$ through energy storage element $C_{f2}$ and transistor $Q_3$. During this process, energy storage element $C_{f2}$ may also be charged by input voltage $V_{in}$. Accordingly, the current flowing through magnetic element $L_{O1}$ can be increased, and the current flowing through magnetic element $L_{O2}$ decreased.

After dead time $T_d$ has elapsed from the falling edge of control signal $G_1$, control signals $G_2$ and $G_{SR1}$ may both be at high levels, and then transistors $Q_2$, $Q_4$, and $Q_{SR1}$ can be turned on, and transistors $Q_1$, $Q_3$, and $Q_{SR2}$ turned off. In this case, energy storage element $C_{f2}$ can be discharged, and energy storage element $C_{f1}$ may be charged. For example, energy storage element $C_{f2}$ can be discharged to supply power for magnetic element $L_{O2}$ through transistors $Q_{SR1}$ and $Q_4$. Also, input voltage $V_{in}$ may supply power for magnetic element $L_{O2}$ through transistor $Q_2$ and energy storage element $C_{f1}$ at the same time. Therefore, the current flowing through magnetic element $L_{O1}$ can be decreased, and the current flowing through magnetic element $L_{O2}$ increased.

Similarly, after transistors $Q_1$ and $Q_3$ are turned off, the current flowing through the parasitic inductor (not shown in FIG. 7) of energy storage element $C_{f1}$ may freewheel through the body diode of transistor $Q_2$, and the voltage across the two power terminals of transistor $Q_2$ can be zero. Also, the current flowing through the parasitic inductor (not shown in FIG. 7) of energy storage element $C_{f2}$ may freewheel through the body diode of transistor $Q_4$, and the voltage across the two power terminals of transistor $Q_4$ can be zero. That is, when transistors $Q_1$ and $Q_3$ are turned off, transistors $Q_2$ and $Q_4$ may be turned on after dead time $T_d$, in order to realize the ZVS of transistors $Q_2$ and $Q_4$.

Figure 8:
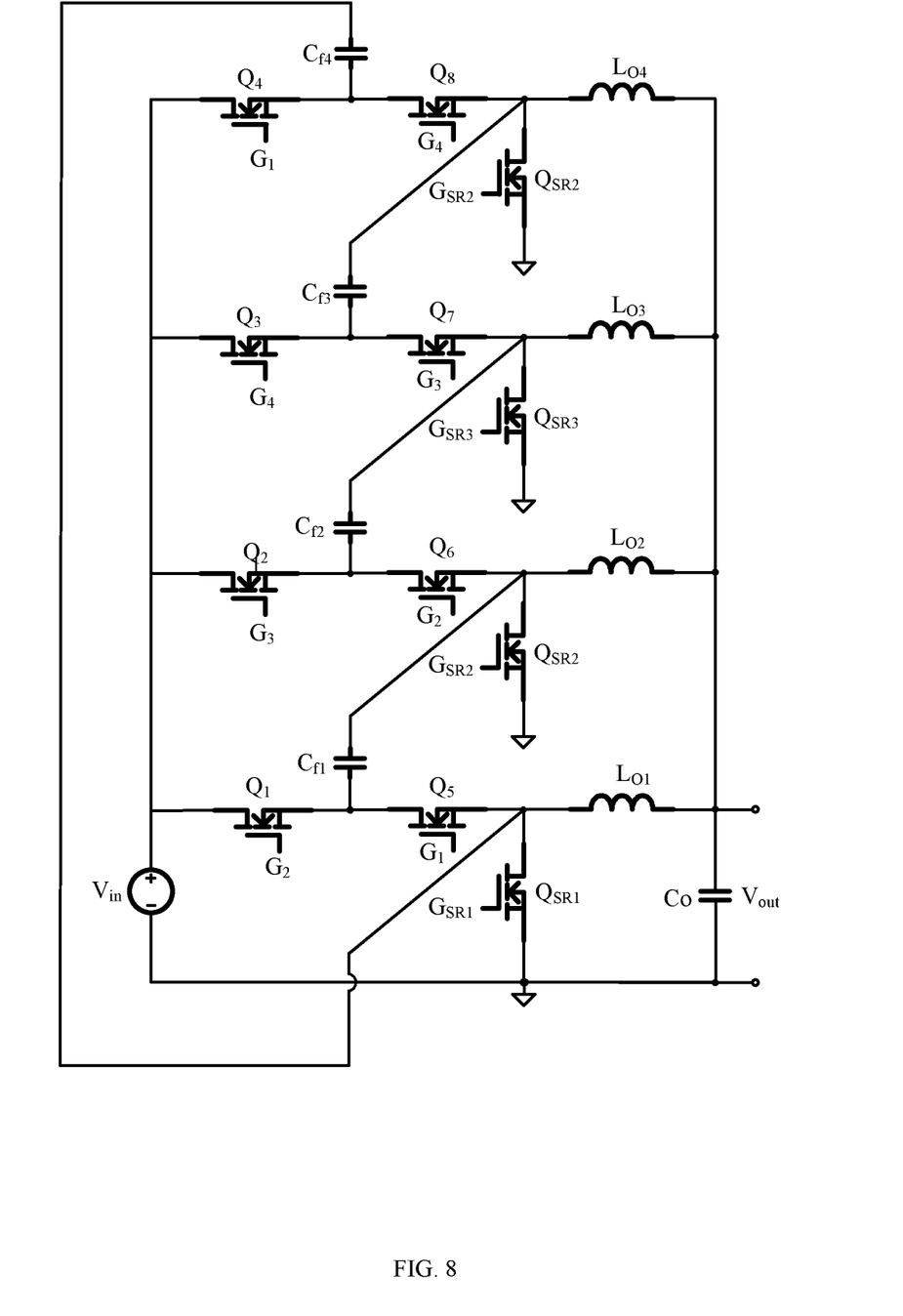
FIG. 8 is a schematic block diagram of a fifth example power converter, in accordance with embodiments of the present invention.

Referring now to FIG. 8, shown is a schematic block diagram of a fifth example power converter, in accordance with embodiments of the present invention. In this particular, the power converter can be extended to multi-phase applications, and the power converter may include four switching power stage circuits. In this example, a cross structure is shown, which aims to couple the energy storage element with two adjacent switching power stage circuits, and each energy storage element can connect between the main transistors of the two adjacent switching power stage circuits, and to the magnetic element of at least one switching power stage circuit.

Figure 9:
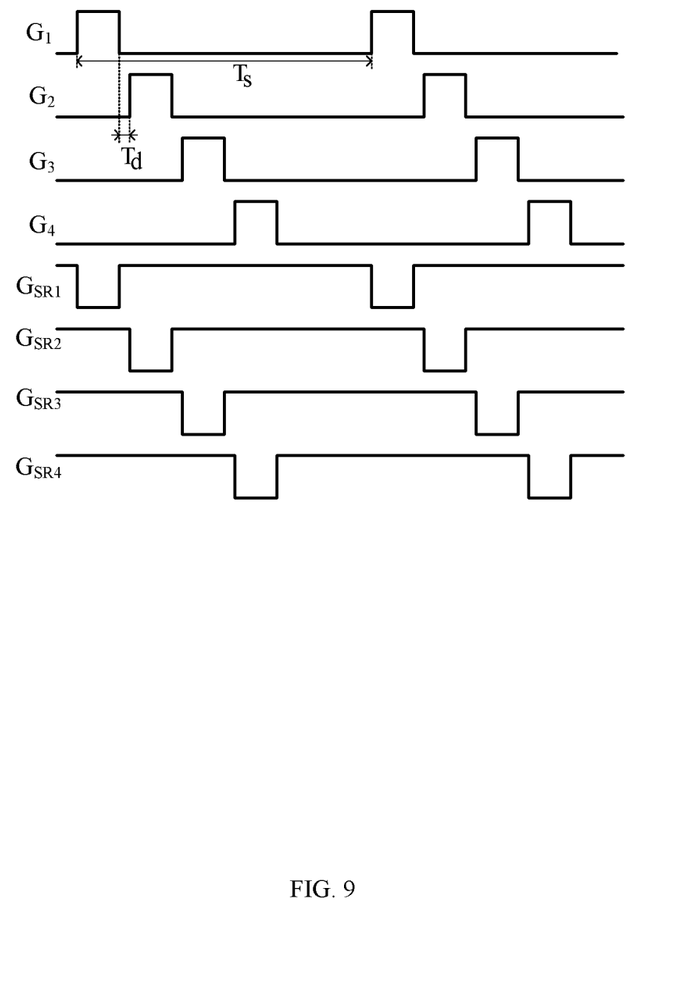
FIG. 9 is a waveform diagram of example operation of the power converter in the fifth example, in accordance with embodiments of the present invention.

Referring now to FIG. 9, shown is a waveform diagram of an example operation of the power converter in the fifth example, in accordance with embodiments of the present invention. When control signals $G_1$, $G_{SR2}$, $G_{SR3}$, and $G_{SR4}$ are at high levels, transistors $Q_4$, $Q_5$, $Q_{SR2}$, $Q_{SR3}$, and $Q_{SR4}$ can be turned on, and other transistors turned off. In this case, energy storage element $C_{f1}$ can be discharged through transistor $Q_5$ to supply power for magnetic element $L_{O1}$. Also, input voltage $V_{in}$, may supply power for magnetic element $L_{O1}$ through transistor $Q_4$ and energy storage element $C_{f4}$ at the same time. Energy storage element $C_{f4}$ may also be charged by input voltage $V_{in}$, during this process. Therefore, current I1 flowing through magnetic element $L_{O1}$ can be increased. Also, current I2 flowing through magnetic element $L_{O2}$, current I3 flowing through magnetic element $L_{O3}$, and current I4 flowing through magnetic element $L_{O4}$ may be decreased.

After a dead time $T_d$ has elapsed from control signal $G_1$ going to a low level, when control signals $G_2$, $G_{SR1}$, $G_{SR3}$, and $G_{SR4}$ are at high levels, transistors $Q_1$, $Q_6$, $Q_{SR1}$, $Q_{SR3}$, and $Q_{SR4}$ can be turned on and other transistors turned off. In this case, energy storage element $C_{f2}$ may be discharged through transistor $Q_6$ to supply power for magnetic element $L_{O2}$. Also, input voltage $V_{in}$, may supply power for magnetic element $L_{O2}$ through transistor $Q_1$ and energy storage element $C_{f1}$, and energy storage element $C_{f1}$ can be charged by input voltage $V_{in}$, during this process. Therefore, current I2 flowing through magnetic element $L_{O2}$ can be increased. Also, current I1 flowing through magnetic element $L_{O1}$, current I3 flowing through magnetic element $L_{O3}$, and current I4 flowing through magnetic element $L_{O4}$ may be decreased.

After dead time $T_d$ has elapsed from control signal $G_2$ going to a low level, when control signals $G_3$, $G_{SR1}$, $G_{SR2}$, and $G_{SR4}$ are at high levels, the operation process of the power converter can be similar to the process mentioned above until one operation cycle ends. Similarly, the ZVS of the transistors controlled by control signals $G_2$, $G_3$, and $G_4$ can be realized. In this example, control $G_1$ may transition to be at a high level in a next switching cycle after control signal $G_4$ transitions to be at a low level. Accordingly, transistor $Q_4$ may not be turned on before the process during which the current flowing through parasitic inductor $L_{stray}$ (not shown in FIG. 9) of energy storage element $C_{f4}$ freewheels through the body diode of transistor $Q_4$ ends. Also, transistor $Q_5$ may not be turned on before the process during which the current flowing through parasitic inductor $L_{stray}$ (not shown in FIG. 9) of energy storage element $C_{f1}$ freewheels through the body diode of transistor $Q_5$ ends. In this case, the ZVS of transistors $Q_4$ and $Q_5$ may not be realized. Therefore, only the ZVS of the transistors controlled by control signal $G_1$ may not be realized, and the switching loss reduced for the multi-phase power converter.

Figure 10:
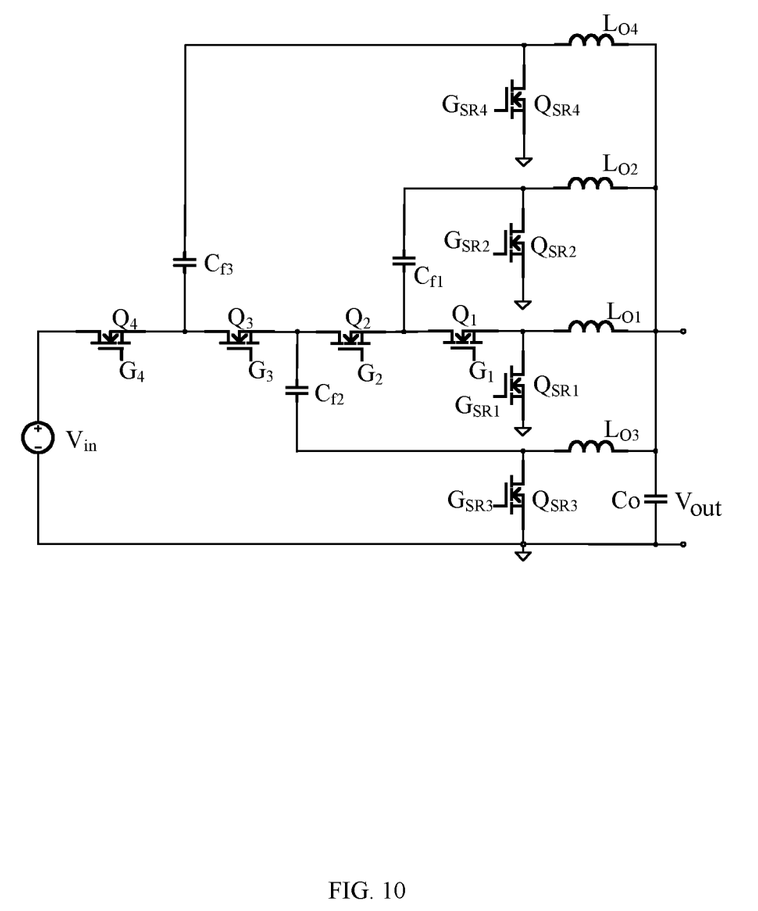
FIG. 10 is a schematic block diagram of a sixth example power converter, in accordance with embodiments of the present invention.

Referring now to FIG. 10, shown is a schematic block diagram of a sixth example power converter, in accordance with embodiments of the present invention. In this particular example, the power converter can be extended to multi-phase applications, and can include four switching power stage circuits. This example aims to couple the energy storage element with two different switching power stage circuits, and each energy storage element can connect between two main transistors of two different switching power stage circuits, and to the magnetic element of at least one switching power stage circuit.

The waveform diagram of the operation of the power converter in this example can be the same as that shown in FIG. 9. Referring back to FIG. 9, when control signals $G_1$, $G_{SR2}$, $G_{SR3}$, and $G_{SR4}$ are at high levels, transistors $Q_1$, $Q_{SR2}$, $Q_{SR3}$, and $Q_{SR4}$ can be turned on, and other transistors are turned off. In this case, energy storage element $C_{f1}$ can be discharged through transistors $Q_1$ and $Q_{SR2}$ to supply power for magnetic element $L_{O1}$. Accordingly, current I1 flowing through magnetic element $L_{O1}$ can be increased, and the currents flowing through other magnetic elements decreased.

After dead time $T_d$ has elapsed from control signal $G_1$ going to a low level, when control signals $G_2$, $G_{SR1}$, $G_{SR3}$, and $G_{SR4}$ are at high levels, transistors $Q_2$, $Q_{SR1}$, $Q_{SR3}$, and $Q_{SR4}$ can be turned on, and other transistors turned off. In this case, energy storage element $C_{f2}$ can be discharged, energy storage element $C_{f1}$ may be charged. For example, energy storage element $C_{f2}$ can be discharged to supply power for magnetic element $L_{O2}$ through transistor $Q_{SR1}$ and energy storage element $C_{f1}$. Accordingly, current I2 flowing through magnetic element $L_{O2}$ can be increased, and the currents flowing through other magnetic elements decreased.

After dead time $T_d$ has elapsed from control signal $G_2$ going to a low level, when control signals $G_3$, $G_{SR1}$, $G_{SR2}$, and $G_{SR4}$ are at high levels, transistors $Q_3$, $Q_{SR1}$, $Q_{SR2}$, and $Q_{SR4}$ can be turned on, and other transistors turned off. In this case, energy storage element $C_{f3}$ can be discharged, energy storage element $C_{f2}$ may be charged. For example, energy storage element $C_{f3}$ can be discharged to supply power for magnetic element $L_{O3}$ through transistor $Q_{SR4}$ and energy storage element C. Accordingly, current I3 flowing through magnetic element $L_{O3}$ can be increased, and the currents flowing through other magnetic elements may be decreased.

After dead time $T_d$ has elapsed from control signal $G_3$ going to a low level, when control signals $G_4$, $G_{SR1}$, $G_{SR2}$, and $G_{SR3}$ are at high levels, transistors $Q_4$, $Q_{SR1}$, $Q_{SR2}$, and $Q_{SR3}$ can be turned on, and other transistors may be turned off. In this case, energy storage element $C_{f3}$ can be charged. For example, input voltage $V_{in}$, may supply power for magnetic element $L_{O3}$ through transistor $Q_4$ and energy storage element $C_{f3}$. Accordingly, current I4 flowing through magnetic element $L_{O4}$ can be increased, and the currents flowing through other magnetic elements may be decreased.

In particular embodiments, after the main transistor of the last switching power stage circuit is turned off, the main transistor of the next switching power stage circuit can be turned off after the dead time has elapsed. Since the current flowing through the parasitic inductor of the energy storage element freewheels through the main transistor of the next switching power stage circuit, the voltage across the power terminals of the main transistor of the next switching power stage circuit may be zero, such that the ZVS of the main transistor of the next switching power stage circuit can be realized. Therefore, in this example, the ZVS of transistors $Q_2$, $Q_3$, and $Q_4$ can be realized.

Figure 11:
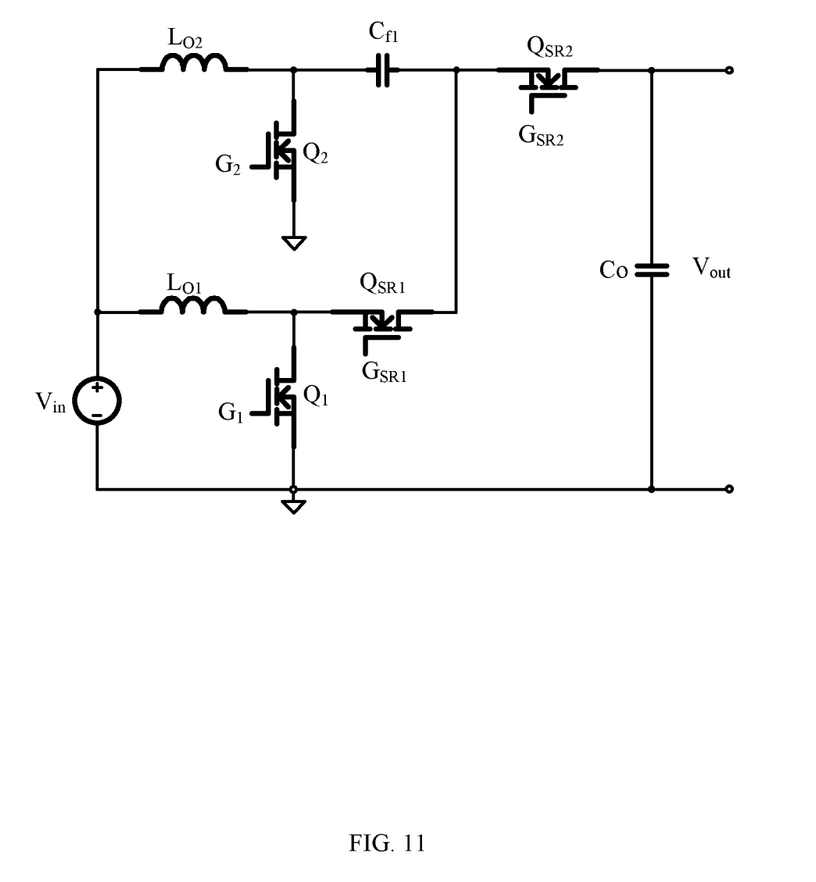
FIG. 11 is a schematic block diagram of a seventh example power converter, in accordance with embodiments of the present invention.

Referring now to FIG. 11, shown is a schematic block diagram of a seventh example power converter, in accordance with embodiments of the present invention. In this particular example, each switching power stage circuit is a boost circuit and the operation process and principle is substantially similar to that in the first example above.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A power converter, comprising:
   a) N switching power stage circuits, wherein output terminals of the N switching power stage circuits are connected in parallel, and N is a positive integer;
   b) an energy storage element coupled between an input terminal and the output terminal of the power converter, wherein the energy storage element is configured to periodically store energy for delivery to the output terminal of the power converter; and
   c) wherein a turn-on moment of a main transistor of an (M+1)-th switching power stage circuit is determined by a turn-off moment of a main transistor of an M-th switching power stage circuit, and a time length between the turn-on moment of the main transistor of the (M+1)-th switching power stage circuit and a turn-on moment of the main transistor of the M-th switching power stage circuit in one switching cycle is equal to a conduction time of the main transistor of the M-th switching power stage circuit plus a controlled time, in order to realize zero-voltage-switching (ZVS) of the main transistor of (M+1)-th switching power stage circuit, wherein M is a positive integer less than N, and wherein an output voltage of the power converter is adjusted by adjusting a duty cycle of each main transistor.

2. The power converter of claim 1, wherein the length of the controlled time is adaptively adjusted to realize the ZVS of the main transistor of the (M+1)-th switching power stage circuit.

3. The power converter of claim 2, wherein the controlled time is a dead time having a duration that is not greater than a freewheeling time of a current flowing through a parasitic inductor of the energy storage element.

4. The power converter of claim 2, wherein the controlled time is a dead time having a duration that is not greater than a freewheeling time of a current flowing through an auxiliary inductor connected in series with the energy storage element.

5. The power converter of claim 1, wherein after the main transistor of the M-th switching power stage circuit corresponding to the energy storage element is turned off, a current corresponding to the energy storage element freewheels through a body diode of the main transistor of the (M+1)-th switching power stage circuit, in order to realize the ZVS of the main transistor of the (M+1)-th switching power stage circuit.

6. The power converter of claim 5, wherein the energy storage element is configured to periodically store energy for delivery to the output terminal of the power converter through the switching power stage circuit corresponding to the energy storage element.

7. The power converter of claim 1, wherein a duty ratio of the main transistor in each switching power stage circuit is less than 1/N.

8. The power converter of claim 1, wherein N switching power stage circuits are interleaved to alternately operate, and a phase difference between two adjacent switching power stage circuits is less than 360°/N.

9. The power converter of claim 1, wherein the energy storage element is coupled with two different switching power stage circuits.

10. The power converter of claim 9, wherein the energy storage element is coupled with the main transistors of two adjacent switching power stage circuits, and with the magnetic element of at least one of the N switching power stage circuits.

* * * * *